July 31, 1923.
I. C. SHUSTER
FIXTURE FOR BRAKE RODS
Filed July 29, 1921
1,463,557
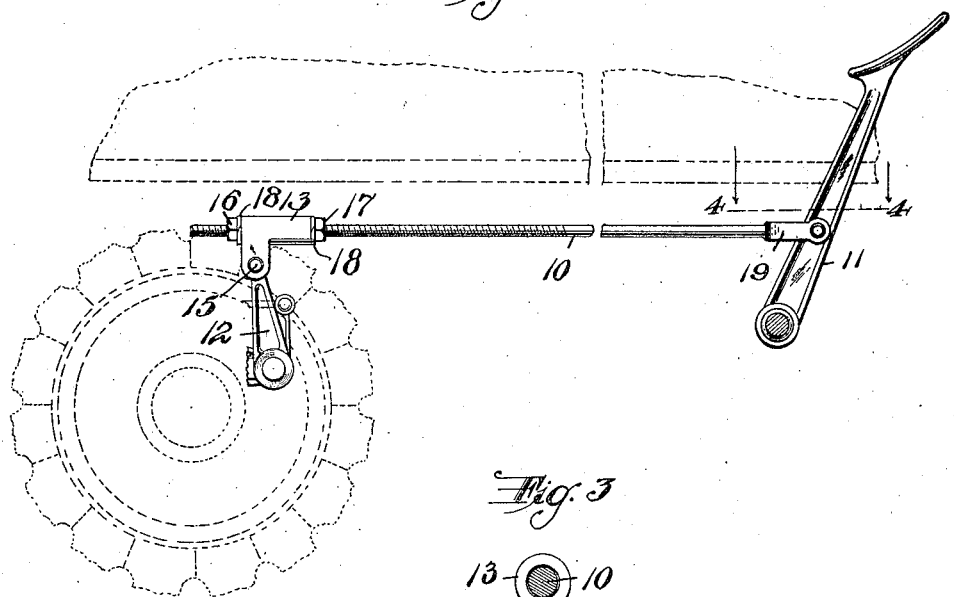
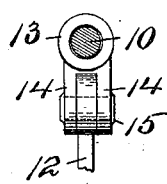
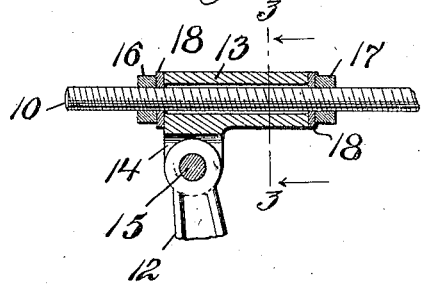
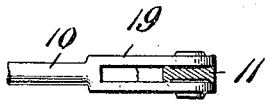
INVENTOR
Irving C. Shuster.
BY
Wm H Caufield.
ATTORNEY Patented July 31, 1923.

1,463,557

UNITED STATES PATENT OFFICE.

IRVING C. SHUSTER, OF NEWARK, NEW JERSEY.

FIXTURE FOR BRAKE RODS.

Application filed July 29, 1921. Serial No. 488,267.

*To all whom it may concern:*

Be it known that I, IRVING C. SHUSTER, a citizen of the United States, and a resident of Newark, county of Essex, and State of New Jersey, have invented certain new and useful Improvements in Fixtures for Brake Rods, of which the following is a specification.

This invention relates to a brake rod fixture which is to be used as a connection between the brake rod and the brake lever and provides for a maximum range for adjustment, whereby the fixture can take up on the rod as the brake lining wears, and can also be placed at the initial position on the substitution of new brake lining for one that is worn out.

The present manner of securing these rods and levers together is by means of a clevis which can be adjusted for a small distance, but as soon as the rod abuts on the pivotal pin that connects the clevis and the lever the rod is cut off to permit further adjustment. This compensates for the wear on a brake lining, but when a new lining is inserted the lever swings back and the absence of the part of the rod that was cut off makes it necessary to provide a new rod.

The present invention overcomes this necessity and the same brake rod is used with new or old brake linings.

The invention is illustrated in the accompanying drawing, in which Figure 1 is a side view of part of the brake mechanism of an automobile showing my improved fixture in position. Figure 2 is a detail section of the fixture on the end of the brake lever. Figure 3 is a section on line 3—3 in Figure 2. Figure 4 is a section on line 4—4 in Figure 1.

The brake rod 10 is connected at one end to an element from which it is operated, the drawing showing a foot lever 11. The brake lever 12 is connected with the brake to operate it, the details of the brake being omitted as the ordinary brake used in automobiles is the type considered, and the brake lever is connected by the improved fixture to the brake rod.

The fixture comprises a barrel 13 which is provided with means for pivotally attaching it to the brake lever, the means illustrated consisting of wings 14, through which and the end of the lever 12 the bolt 15 passes. The rod is screw-threaded, for a considerable distance from its end, the barrel being slidable on the rod and thus being adjustable thereon. Means for locking it in adjusted position is typified by the nuts 16 and 17 which, with the lock nuts 18, hold the rod in its desired position relative to the fixture.

The fixture is well toward the end of the rod when a new brake lining is being used, and as the lining wears the barrel is moved forward on the rod and then locked. When the lining is worn out the barrel can again be moved back and fastened near the end of the rod, as will be evident.

In the old form a clevis similar to the one shown at 19 is used to connect the lever 12 by the bolt 15. The clevis is screwed on the rod, and when the adjustment has proceeded so that the rod abuts on the bolt it is cut off and threaded again, and this continues, as movement of the end of the lever 12 between the positions with new and old brake linings is considerable.

When a new lining is inserted with the clevis in use, a new rod must be installed as, of course, the absence of the severed parts of the old rod makes it too short for use, as the lever 12 can not be swung far enough back.

The present device is more easily adjusted than the old, it is of low cost as to manufacture and it permits the continued use of the old brake rod.

There is no strain other than longitudinal, as the tangential pull on the lever 12 remains such on account of the pivotal connection 15.

I claim:

1. A brake rod fixture comprising a clip having an open-ended barrel with wings extending therefrom, the wings being adapted to be pivotally connected to a brake lever, and a brake rod secured to the barrel and adjustable therein.

2. A brake rod fixture comprising a clip having a barrel with wings extending therefrom, the wings being adapted to be pivotally connected to a brake lever, and a brake rod passing through the barrel and having a material length thereof provided with a screw-thread, and nuts on the rod and adapted to be seated at both ends of the barrel.

3. A brake rod fixture comprising a clip having an open-ended barrel portion having means thereon for pivotally securing it to a brake lever, said pivot being out of line with the axis of the barrel, a brake rod slidable freely through the barrel, and means for adjustably securing the rod in the barrel.

4. A brake rod fixture comprising a clip having an open-ended barrel portion having means thereon for pivotally securing it to a brake lever, said pivot being out of line with the axis of the barrel, a brake rod slidable freely through the barrel and having a screw-threaded portion extending along a considerable length thereof, and nuts on the screw-threaded portion and at both ends of the barrel.

In testimony that I claim the foregoing, I have hereto set my hand, this 11th day of February, 1921.

IRVING C. SHUSTER.